A. V. JENSEN.
LOADING APPARATUS.
APPLICATION FILED JAN. 15, 1914.
1,120,200.
Patented Dec. 8, 1914.
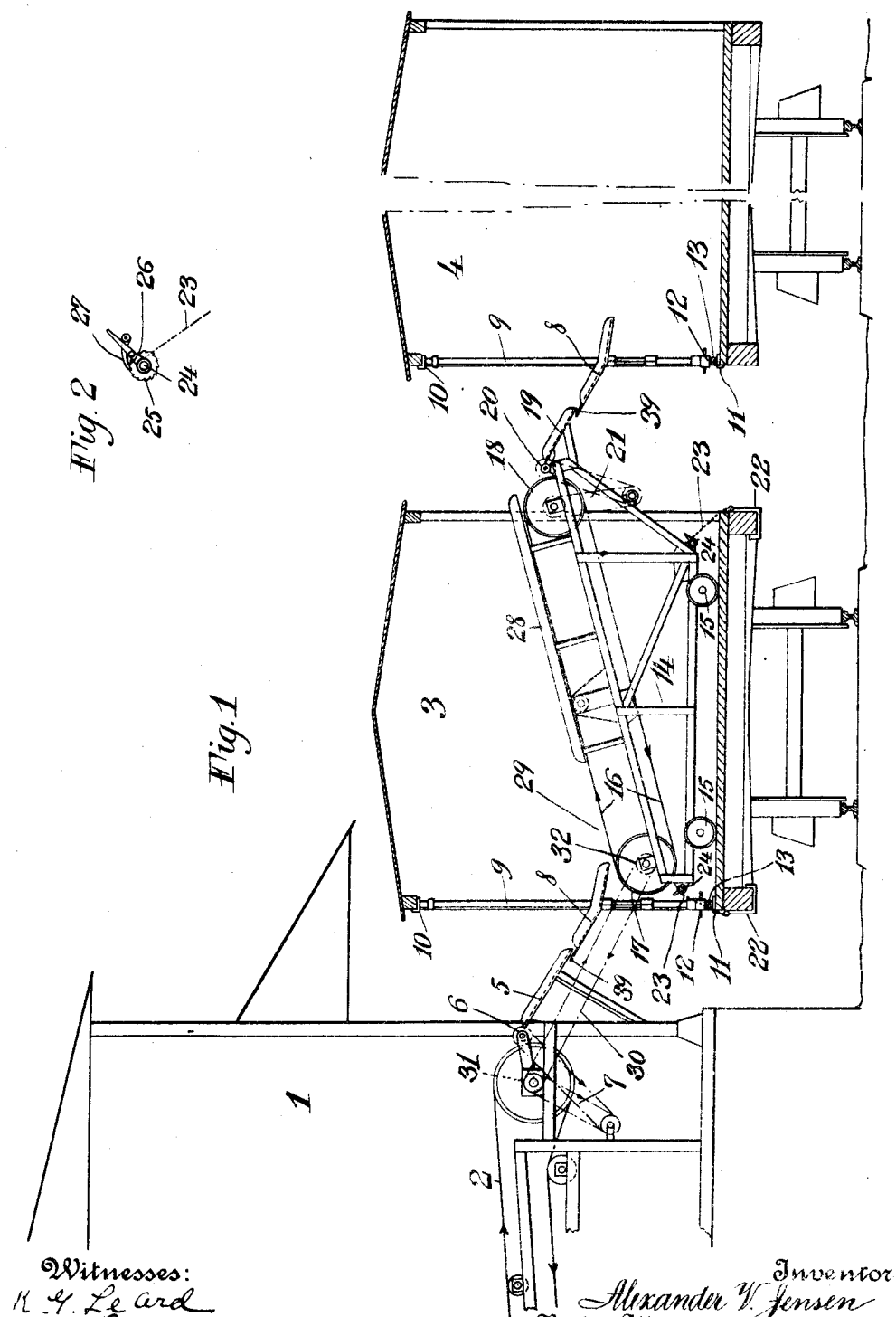

UNITED STATES PATENT OFFICE.

ALEXANDER V. JENSEN, OF DEVILS SLIDE, UTAH.

LOADING APPARATUS.

1,120,200.  Specification of Letters Patent.  Patented Dec. 8, 1914.

Application filed January 15, 1914. Serial No. 812,207.

*To all whom it may concern:*

Be it known that I, ALEXANDER V. JENSEN, a citizen of the Danish Monarchy, and a resident of Devils Slide, Morgan county, Utah, have invented certain new and useful Improvements in Loading Apparatus, of which the following is a specification.

This invention relates to loading apparatus with particular reference to an apparatus for loading bags of cement on board railroad cars. It will be seen, however, as this specification proceeds in setting forth the detailed construction of my invention, that it is not at all limited to the loading of bags of cement, or in fact to loading of any particular package or kind of material, but that the features of my invention are adapted for use in loading different kinds of material under circumstances and conditions entirely different from those specifically described or illustrated, and I wish it distinctly understood that I do not intend to limit the features or use of my invention except as defined by the claims.

The object of my invention is to provide a loading apparatus for loading packages of materials, such as bags or cement or the like, on board railroad cars in such a manner that the operation becomes safe and whereby the loading may be done expeditiously and two or more cars may be loaded at the same time.

Another object of my invention is to provide an apparatus of simple practical construction adapted to be set up for use quickly and securely.

Still another object is to provide an apparatus which under certain conditions may be used for unloading as well as for loading.

Other objects of the invention will appear as the specification proceeds while reference is had to the accompanying drawing in which—

Figure 1 is a general view of an apparatus embodying my invention and showing the same set up for loading two railroad cars, and Fig. 2 is a detail view of a ratchet mechanism.

The reference numeral 1 represents a building of a cement plant provided with a suitable conveyer 2 for conveying the bags of cement from the packing machines, not shown.

3 and 4 represent railroad cars standing on parallel tracks. Heretofore it has been proposed to load the two cars by using a long chute which reached from the conveyer 2 through the car 3 into the car 4. This arrangement requires that the inner end of the chute be elevated sufficiently to cause the bags of cement to slide down easily into the second car, and this arrangement also necessitates that the packing machines be elevated sufficiently to permit the conveyer 2, which is located below said machines, to deliver the bags to the elevated end of the chute aforesaid. When for some reason one of the cars starts, it wrecks the chute, causing serious damage and accidents. In the present instance I arrange the loading apparatus in such a manner that even should one or both cars start no accident due to the wrecking of the conveyer will occur. Moreover, the apparatus is so arranged that the conveyer 2 may be quite low and the packing machines need not be unduly elevated.

The conveyer 2 discharges onto an apron or chute 5, the bags passing over an idler 6 driven from the conveyer by sprocket wheels and chains as indicated at 7. From 5 the bags slide down to a receiving apron or chute 8 which is secured in the car opening by the following means: The apron 8 is carried by a post 9 which is set up vertically in the door of the car and which carries an upper and lower shoe 10 and 11. The post is securely fixed in position so that the said feet will engage the floor and top of the door opening by means of a nut 12 which engages the threaded stem 13 of the post. By turning the nut the post will be lengthened and expanded so to speak in the door opening. The precise details of the door apron and accompanying parts are made the subject of a separate application for patent filed simultaneously with this application. A second receiving door apron and fastening means for the same is secured in the door opening of the second car 4 as shown and the parts are numbered to correspond with those above.

14 denotes a truck provided with wheels 15 and adapted to be wheeled into the car 3 through the door thereof. The said truck carries a conveyer 16 in the form of a belt which runs over the drums 17 and 18. The conveyer 16 discharges into a discharging apron 19 over an idler 20 driven from the drum 18 by sprocket wheels and chains at 21. If desired, the apron 19 may be hinged to the drum shaft so as to be collapsible. The apron 19 discharges into the second door apron 8, which discharges into the car 4. The conveyer 16 may be adjusted transversely of the car and secured in position by means of two clamps 22, 22 at the ends of chains 23, 23 adapted to be wound around shafts 24, 24 by a ratchet wheel 25 and pawl 26 as shown in Fig. 2, in which 27 is a stop dog for the ratchet wheel to prevent accidental rotation thereof as is usual. The truck conveyer 16 is provided with guide rails 28 to guard the bags against falling off of the conveyer. It should be noted, however, that the guide rails do not extend clear to the apron 8 at the lower end of the conveyer, but that at 29 bags may be removed for loading car 3. For instance, every other bag may be taken off at 29 for car 3 and every other bag pass into car 4 to be stacked by hand in each car.

In operation the two railroad cars are placed on the tracks with their doors in alinement with the door of the building 1. The door aprons 8 are placed in position and the truck conveyer wheeled into car 3 and adjusted transversely and secured by the clamps 11, and the chain 30 is placed on sprocket wheels 31 and 32 for driving conveyer 16. It will then be understood that the bags of cement are carried by conveyer 2 to aprons 5 and 8, and by conveyer 16 to aprons 5 and 8 into car 4, and as noted, bags may be taken off at 29 to load car 3. The aprons 8 are provided with lips 39 which reach under aprons 5 and 19.

It will be observed that the entire arrangement is very simple and quickly set up and taken down. Again, in case either of the cars should commence to move, no harm will be done to the apparatus. If the car 3 moves, it will take with it the truck conveyer 16 and the apron 8 secured to the car. The chain 30 is the only physical connection between the truck conveyer and the conveyer 2. When the car 3 moves accidentally, the chain 30 may break or either of the sprocket wheels 31 and 32 may be arranged to slide off its shaft to prevent injury. When car 4 moves accidentally, it takes its apron 8 along but causes no breaks of any kind.

As already pointed out, this loading apparatus may be used for unloading also in that the conveyer 16 may discharge at its elevated end on to a conveyer 2.

As here described and illustrated the invention comprises a portable conveyer 16 adapted to be placed in a railroad car and fixed door aprons from which and into which the conveyer transports the material. The details of the construction may be changed and the arrangement varied within the scope of the appended claims.

I claim:—

1. A loading apparatus for loading one railroad car from another railroad car comprising in combination a receiving apron, means for securing the same in the door opening of the car to be loaded, a discharging apron supported in the other car and arranged to discharge into the said receiving apron, the said two aprons being adapted to be adjusted laterally with respect to each other and conveying means in said other car for conveying material to the said discharging apron.

2. A loading apparatus for loading one railroad car from another railroad car comprising in combination a receiving apron, means for securing the same in the door opening of the car to be loaded, a conveyer for transporting material to the said receiving apron, means for securing said conveyer in the other car, a discharge apron secured to said conveyer for discharging the material into said receiving apron, the said two aprons being adapted to be adjusted laterally with respect to each other, means for adjusting one of the said two aprons vertically and means for operating the said conveyer.

3. A loading apparatus for loading railroad cars placed alongside each other and comprising in combination a plurality of receiving aprons, means for securing one of said receiving aprons in a door opening of each of said cars, a conveyer, means for securing said conveyer inside the one car in alinement with the receiving apron therein and means for operating said conveyer to transport the material from the receiving apron in the one car to the receiving apron in the other car.

4. A loading apparatus for loading railroad cars placed alongside each other and comprising in combination a first receiving apron secured in a door opening in the one car, a second receiving apron secured in a door opening in the second car, a conveying mechanism adapted to be placed in the one car to bridge between the said two receiving aprons, means for securing said conveying mechanism in position and means for operating the same.

5. A loading apparatus for loading adjacent cars comprising in combination a plurality of receiving aprons, means for securing one of said aprons in each of the said cars, a conveying mechanism, means for securing the same in the one car in alinement with the receiving apron therein, a discharge apron secured to the said conveying mechanism and arranged to bridge from the latter to the receiving apron in the car to be loaded, the last named receiving apron and the said discharge apron being adapted to be adjusted laterally of each other and means for operating said conveying mechanism to transport material from the one of the said receiving aprons to the said discharge apron.

Signed at Ogden, Utah this 5th day of January 1914.

ALEXANDER V. JENSEN.

Witnesses:
R. R. DORLAND,
IVAN KONIGSBERG.